(12) United States Patent
Jiang et al.

(10) Patent No.: US 7,920,440 B2
(45) Date of Patent: Apr. 5, 2011

(54) METHOD FOR REAL-TIME CALCULATION OF RECEIVE FOCUSING PARAMETERS FOR BEAMFORMING AND APPARATUS THEREOF

(75) Inventors: Yong Jiang, Shenzhen (CN); Qinjun Hu, Shenzhen (CN); Dongbiao Cheng, Shenzhen (CN)

(73) Assignee: Shenzen Mindray Bio-Medical Electronics Co., Ltd., Shenzen (CN)

( * ) Notice: Subject to any disclaimer, the term of this patent is extended or adjusted under 35 U.S.C. 154(b) by 1152 days.

(21) Appl. No.: 11/636,284

(22) Filed: Dec. 8, 2006

(65) Prior Publication Data

US 2008/0024755 A1    Jan. 31, 2008

(30) Foreign Application Priority Data

Jul. 28, 2006 (CN) .......................... 2006 1 0061884

(51) Int. Cl.
*G03B 42/06* (2006.01)
(52) U.S. Cl. .......................................... 367/11; 367/138
(58) Field of Classification Search .................. 367/103, 367/105, 138
See application file for complete search history.

(56) References Cited

U.S. PATENT DOCUMENTS

| | | | |
|---|---|---|---|
| 5,388,079 A * | 2/1995 | Kim et al. | 367/103 |
| 5,581,517 A * | 12/1996 | Gee et al. | 367/138 |
| 6,110,116 A | 8/2000 | Wright et al. | |
| 6,123,671 A | 9/2000 | Miller | |
| 6,252,975 B1 | 6/2001 | Bozdagi et al. | |
| 2008/0024755 A1 * | 1/2008 | Jiang et al. | 356/4.03 |

FOREIGN PATENT DOCUMENTS

| | | |
|---|---|---|
| CN | 1540363 A | 10/2004 |
| WO | WO 2004/112240 A1 | 12/2004 |

OTHER PUBLICATIONS

Ma, Jia-chen,et al., "Research Evolution of Ultrasound Beamforming Technology," Chinese Journal of Medical Instrumentation, Depart. of Control Science and Engineering, Harbin Polytechnic University Harbin, Jun. 29, 2005, pp. 443-445, 438.

* cited by examiner

*Primary Examiner* — Dan Pihulic
(74) *Attorney, Agent, or Firm* — Kory D. Christensen; Stoel Rives LLP

(57) ABSTRACT

A method and an apparatus for real-time calculation of receive focusing parameters for beamforming are provided. The apparatus is coupled to the signal input end of the receive beamforming module of an ultrasound imaging system as an independent accessory, including a first accumulator and a second accumulator for calculating a quantified focus coordinate (Fx,Fz); a distance determination circuit for calculating the distance between the quantified focus coordinate (Fx, Fz) and quantified coordinate ($Elex_j$,$Elez_j$) of the j-th array element of a probe; a third accumulator for accumulating the value of $i*N/2$; and a third summator for reading the output results of the third accumulator and the distance determination circuit, adding both output results up and outputting the added-up result as a reading address of echo data calculated in real time. With the present invention, the system memory resource required is reduced, the circuit is simpler, and the parameter loading is faster.

15 Claims, 5 Drawing Sheets

METHOD FOR REAL-TIME CALCULATION OF RECEIVE FOCUSING PARAMETERS FOR BEAMFORMING AND APPARATUS THEREOF

FIELD OF THE INVENTION

The present invention relates to digital beamforming in medical ultrasound diagnosis system, particularly, to a method for real-time calculation of beamforming focusing parameters in the process of reception and apparatus thereof useful for saving memory resources in the system.

BACKGROUND OF THE INVENTION

As the most key technique in medical ultrasound diagnosis systems, the quality of the beamforming has significant effect on the accuracy and resolution of ultrasound imaging. Most of ultrasound imaging systems have their focusing parameters stored in RAMs within the systems, which ask for a huge number of memories, especially when it is needed to support line array keystone scanning and phased arrays. For example, where a system utilizes a sample of 30 M, a probe depth of 30 cm and the receive focus is shifted every 8 timing clock, if all the receive parameters are to be pre-stored, excessive 200 Mbytes have to be taken up thereby. The increase of memories will necessarily lead to the systems being expensive in fabrication and slow in loading parameters when a probe is switched over.

A solution is to use a real-time parameter calculation hardware. Whereby, as the ultrasound imaging takes a scanning line as the basic unit, storage of a few parameters and a write-in of several control meters before the reception of each scanning line transmission enable the hardware to automatically generate the focusing parameters desired during reception. Thus, memory resources may be significantly saved.

U.S. Pat. No. 6,110,116 provides a focusing method in the course of beamforming by pre-storing delay data. Specifically, the focus data are pre-stored and the echoes of each focusing area use corresponding pre-stored focus data. While this method is simple and convenient, a larger memory is needed and further, many parameters need to be reloaded at the time of changing the probe. Thus, the speed of startup and the switchover of the probe is affected.

U.S. Pat. No. 6,123,671 provides a CORDIC-based method for real-time calculation of receive focus and apodization parameters, which is applicable for various geometrical probes including two-dimensional probes, and for multiple beams. The basic idea of this method is to calculate the delay differences of each array element corresponding to different receive focuses and take the delay differences as the parameters to control the beamforming. Although the method of U.S. Pat. No. 6,123,671 is simple and efficient as well as occupies fewer hardware resources, its circuit is rather complex.

In contrast, the present invention calculates the receive focusing parameters by way of directly calculating the reading address of the memory storing AD conversion data of each channel, instead of calculating delay differences of each array element of the probe. Thus, the circuit is much simpler than that of U.S. Pat. No. 6,123,671. Furthermore, since a real-time calculation is adopted to calculate the receive focus coordinates which thereby do not have to be pre-stored more memory resources may be saved and at the same time, the beam correction may be accomplished.

SUMMARY OF THE INVENTION

It is an object of this invention to provide a method for real-time calculation of the reading address storing AD conversion data memory of each channel for beamforming and apparatus thereof.

The present invention provides the following technical solutions:

A method for real-time calculation of receive focusing parameters for beamforming is designed, comprising the steps of:

a. each array element of a probe receiving the reflected echo signal from a receive line;

b. each array element of said probe transmitting the reflected echo signal as received to respective signal receiving and processing channel for processing and analog-to-digital conversion;

c. transmitting the digitized echo data after analog-to-digital conversion into a FIFO memory;

d. a beamformation parameter generating module calculating in real time the reading address of digitized echo signal of the FIFO memory of each channel;

e. a receive beamforming module, via a beamforming bus, reading the echo data of each receive channel and performing beamforming, according to the reading address generated by the beamformation parameter generating module.

The processing in the above step b includes analog signal amplification and filtration, etc.

The step d is the core technique of the method of the present invention, in which the beam correction may be regarded or disregarded.

Where the beam correction is taken into consideration, if the reading address is calculated every other N sampling points in step d, the reading address corresponding to the echo data concerning the j-th channel and the i-th receive focus of a certain signal receive line are calculated using the formula as follows:

$$Addr_{ij} = \sqrt{\left(\frac{Elex_j}{C} - \frac{Fx_0}{C} - i*\frac{\Delta F_x}{C} - k_i \frac{\Delta F_x}{N_d * C}\right)^2 + \left(\frac{Elez_j}{C} - \frac{Fz_0}{C} - i*\frac{\Delta F_z}{C} - k_i \frac{\Delta F_z}{N_d * C}\right)^2} + i*N/2$$

Wherein $(Elex_j, Elez_j)$ and $(Fx_0, Fz_0)$ are the coordinate of the j-th array element of the probe and the coordinate of the i-th receive focus of a certain signal receive line, respectively; $\Delta F_x$ and $\Delta F_z$ are the difference value of horizontal coordinates and of vertical coordinates of two adjacent receive focuses, respectively; C is the ratio of the echo speed to the sampling rate $f_s$, and $N_d$ is an integral power of 2.

The above-mentioned hardware for real-time calculation of reading address of echo data, taking beam correction into consideration, is realized through the procedures as follows:

i. calculating the original value $Fx_0/C$ and its accumulated amount $i\Delta Fx/C$ using a first accumulator, calculating the original value $Fz_0/C$ and its accumulated amount $i\Delta Fz/C$ using a second accumulator, and calculating $k_i\Delta FX/(CN_d)$ and $k_i\Delta Fz/(CN_d)$ respectively using a first shifter and a second shifter;

ii. adding up the output results of the first accumulator and the first shifter using a first summator and adding up the output results of the second accumulator and the second shifter using a second summator so as to obtain the quantified focus coordinate (Fx,Fz);

iii. a distance determination circuit reading the quantified focus coordinate (Fx,Fz) and quantified coordinate (Elex$_j$, Elez$_j$) of the j-th array element of the probe and calculating the distance between the two coordinates;

iv. accumulating to obtain the value of i*N/2 using a third accumulator;

v. adding up the output results of the third accumulator and the distance determination circuit using a third summator, and the output result of the third summator being the reading address of the echo data calculated in real time.

Where the beam correction is disregarded, if the reading address is calculated every other N sampling points in step d, the reading address corresponding to the echo data concerning the j-th channel and the i-th receive focus of a certain signal receive line are calculated using the formula as follows:

$$Addr_{ij} = \left( \sqrt{\left(\frac{Elex_j}{C} - \frac{Fx_0}{C} - i*\frac{\Delta F_x}{C}\right)^2 + \left(\frac{Elez_j}{C} - \frac{Fz_0}{C} - i*\frac{\Delta F_z}{C}\right)^2} + i*N/2 \right)$$

Wherein (Elex$_j$,Elez$_j$) and (Fx$_0$,Fz$_0$) are the coordinate of the array element of the probe corresponding to the j-th channel and the coordinate of the i-th receive focus of a certain signal receive line, respectively; $\Delta F_x$ and $\Delta F_z$ are the difference value of horizontal coordinates and of vertical coordinates of two adjacent receive focuses, respectively; and C is the ratio of the echo speed to the sampling rate f$_s$.

The above-mentioned hardware for real-time calculation of reading address of echo data, without taking beam correction into consideration, is realized through the procedures as follows:

i. calculating the original value Fx$_0$/C and its accumulated amount i$\Delta$Fx/C using a first accumulator, and calculating the original value Fz$_0$/C and its accumulated amount i$\Delta$Fz/C using a second accumulator, so as to obtain a quantified focus coordinate (Fx,Fz);

ii. a distance determination circuit reading the quantified focus coordinate (Fx,Fz) and quantified coordinate (Elex$_j$, Elez$_j$) of the j-th array element of the probe and calculating the distance between the two coordinates;

iii. calculating the value of i*N/2 using a third accumulator;

iv. adding up the output results of the third accumulator and the distance determination circuit using a third summator, and the output result of the third summator being the reading address of the echo data calculated in real time.

With respect to the two methods for real-time calculation of receive focusing parameters for beamforming with the beam correction regarded and disregarded respectively, the present invention further provides therewith two apparatus for real-time calculation of receive focusing parameters for beamforming.

The apparatus for real-time calculation of receive focusing parameters for beamforming with beam correction disregarded includes at least one focusing data calculator, which apparatus is coupled to the signal input end of the receive beamforming module of an ultrasound imaging system as an independent accessory. The focusing data calculator comprises:

a first accumulator and a second accumulator for calculating a quantified focus coordinate (Fx,Fz);

a distance determination circuit for calculating the distance between the quantified focus coordinate (Fx,Fz) and quantified coordinate (Elex$_j$,Elez$_j$) of the j-th array element of a probe;

a third accumulator for accumulating the value of i*N/2;

a third summator for reading the output results of the third accumulator and the distance determination circuit, adding both output results up and outputting the added-up result as a reading address of echo data calculated in real time;

The distance determination circuit has one input end coupled to the output ends of the first accumulator and the second accumulator, another input end coupled to the output value of the quantified coordinate (Elex$_j$,Elez$_j$) of the j-th array element of the probe. The output end of the distance determination circuit and the output end of the third accumulator are coupled together to the input ends of the third summator.

The apparatus for real-time calculation of receive focusing parameters for beamforming with beam correction taken into consideration includes at least one focusing data calculator, which apparatus is also coupled to the signal input end of the receive beamforming module of an ultrasound imaging system as an independent accessory. The focusing data calculator comprises:

a first accumulator, a first shifter and a first summator for calculating the Fx of quantified focus coordinate (Fx,Fz); a second accumulator, a second shifter and a second summator for calculating the Fz of quantified focus coordinate (Fx,Fz);

a distance determination circuit for calculating the distance between the quantified focus coordinate (Fx,Fz) and quantified coordinate (Elex$_j$,Elez$_j$) of the j-th array element of a probe;

a third accumulator for accumulating the value of i*N/2;

a third summator for reading the output results of the third accumulator and the distance determination circuit, adding both output results up and outputting the added-up result as a reading address of echo data calculated in real time.

The first summator has one input end coupled to the first accumulator and the first shifter, and the second summator one input end coupled to the second accumulator and the second shifter. One input end of the distance determination circuit is coupled to the output ends of the first summator and the second summator, and another input end is coupled to the output end of the quantified coordinate (Elex$_j$,Elez$_j$) of the j-th array element of the probe. The output end of the distance determination circuit and the output end of the third accumulator are coupled together to the inputs of the third summator.

The focusing data calculators of both of the above calculating apparatus are time division multiplexing in M channel, that is, each of the focusing data calculators is responsible for the real-time calculation of the parameters of M channels. If the system has more than M channels, multiple parallel focusing data calculators are used. M ranges from 1 to 512, typically 32 or 64.

The method of the present invention for real-time calculation of receive focusing parameters for beamforming is more advantageous over the prior art. Specifically, While making sure of the beamforming quality, the system needs a smaller number of parameters to be stored, whereby the memory resources of the system is saved, and the circuit is much simpler. In addition, the parameters are loaded faster when the probe is switched over, and also, the beam correction may be accomplished.

DESCRIPTION OF THE PREFERRED EMBODIMENTS

The method and apparatus of the present invention will be described in detail with respect to embodiments with reference to the drawings.

Figure 1:
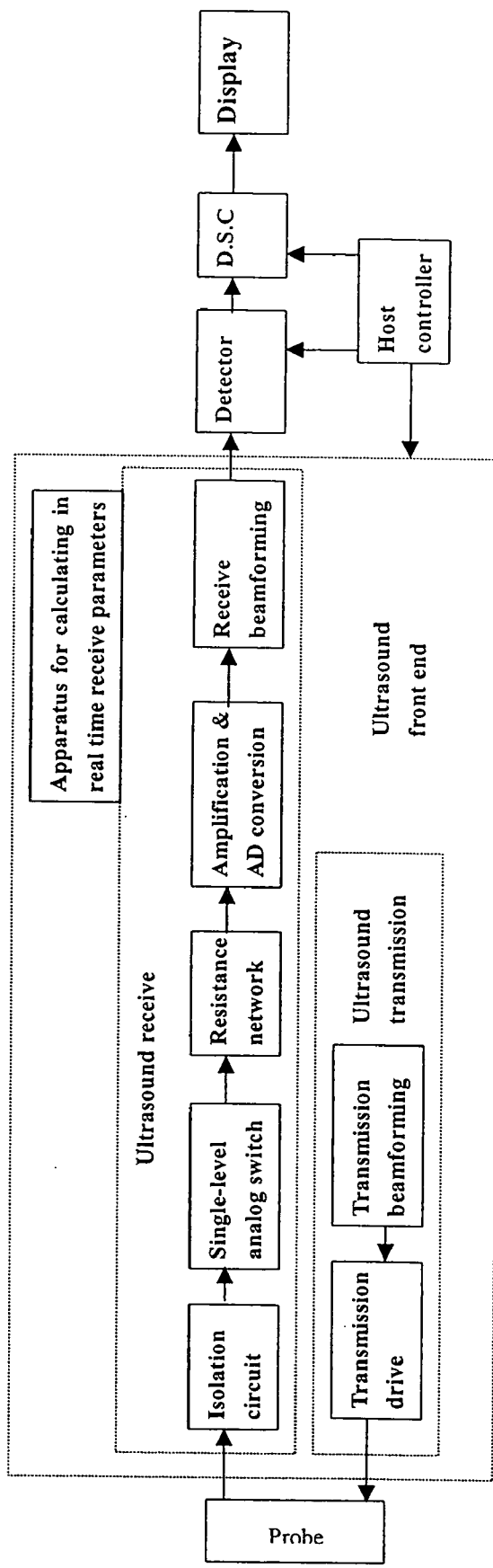
FIG. 1 is a schematic block diagram of an ultrasound imaging system utilizing an apparatus of the present invention.
Figure 8:
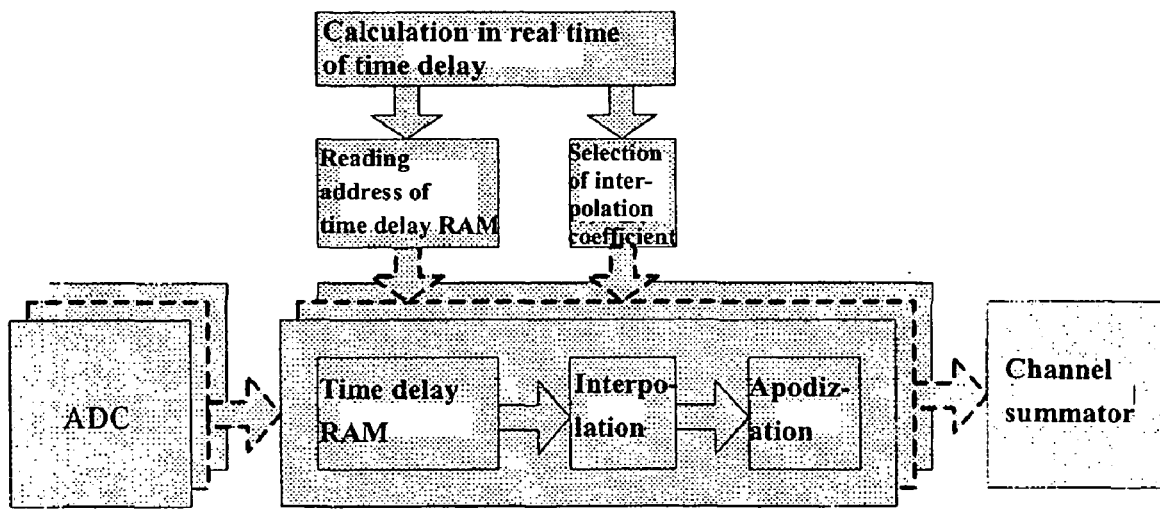
FIG. 8 is a schematic block diagram of the beam formation utilizing the method of the present invention.

FIG. 1 is a block diagram showing the principle of a ultrasound imaging system. In FIG. 1, the apparatus of the present invention for real-time calculation of receive focusing parameters is coupled to the signal input end of the receive beamforming module of the ultrasound imaging system as an independent accessory, as shown in FIGS. 1 and 8.

A 64-channel single-beam ultrasound imaging system will be taken as an example hereunder for description. It is obvious that the method and apparatus of the present invention are also applicable to the systems with different number of channels (e.g. 24, 48 or others) or multiple beams.

I. Basic Principle

Figure 2:
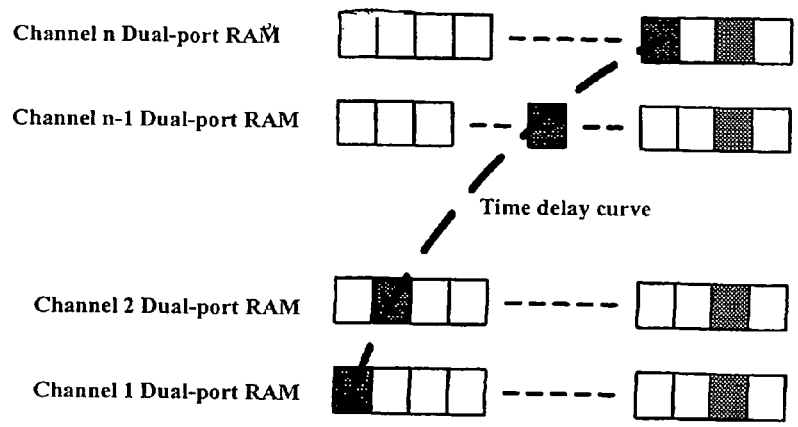
FIG. 2 is a schematic view of receiving focus via the ultrasound imaging system.

FIG. 2 is a schematic view showing how the focus is received according to the present invention. The ultrasound imaging system assigns a memory for each receiving channel, which memory synchronously receives AD converted digitized echo data of each channel. As the echoes returned from the focus receiving point impossibly reach the array element of the probe corresponding to each channel simultaneously, the corresponding AD converted data need to be read from each channel using different reading addresses (the black block in FIG. 2 corresponds to a certain receive focus), which data are then added up to finally accomplish receive focusing. To receive focusing is therefore to control the RAM reading addresses of each channel. In this invention, the calculation of beamformation parameters is equivalent to the calculation of the RAM reading address of each channel.

Figure 3:
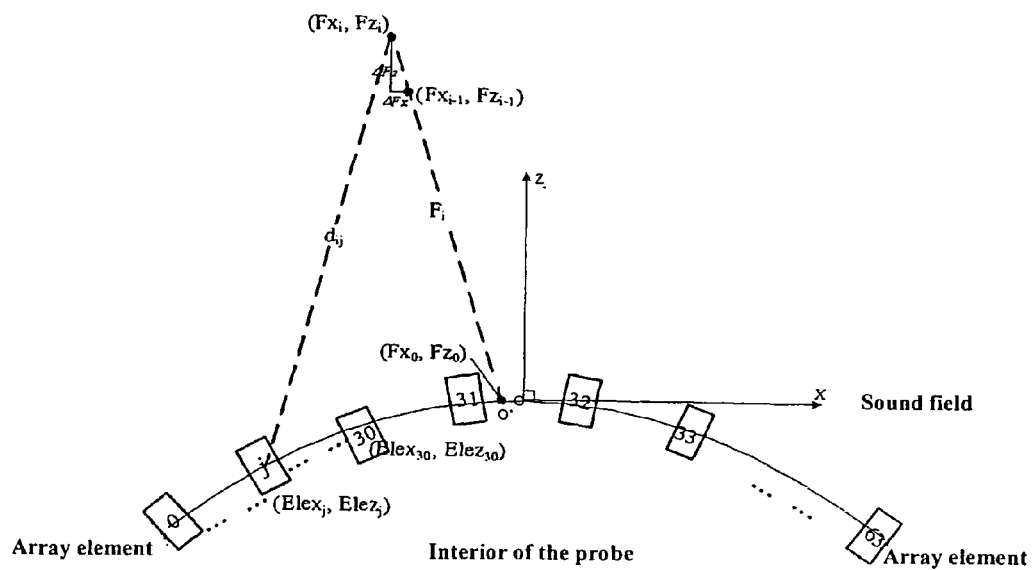
FIG. 3 is a schematic view of a method for real-time calculation of receive focusing parameters for beamforming according to the present invention.

Most of the ultrasound imaging systems (such as U.S. Pat. No. 6,123,671) calculate the time delay difference between the central array element of the receive channel and the other array elements, and based thereon calculate the RAM reading address of each channel. Actually, it is not necessary to do so. As shown in FIG. 3, as for a scanning line, the coordinate of the i-th receive focus is $(Fx_i, Fz_i)$, the path an acoustic pulse passes from its emission to the arrival at the receive focus and finally back to the array element j (only part of them reflected back) may be approximately shown as the dotted lines in FIG. 3, and the overall length of the path is represented as:

$$D_{ij}=d_{ij}+F_i=\sqrt{(Elex_j-Fx_i)^2+(Elez_j-Fz_i)^2}+F_i$$

Wherein j is the serial number of the array element, which shall be 1 to 64 for a 64-channel system, and i is the serial number of the receive focus.

The corresponding propagation time of the acoustic wave is represented as:

$$T_{ij}=D_{ij}/c$$

The RAM of each channel begins to receive AD data from the moment at which the acoustic pulse is emitted, so the reading address corresponding to the returned echo from the focus i to the array element j is represented as:

$$Addr_{ij}=T_{ij}*f_s=(\sqrt{(Elex_j-Fx_i)^2+(Elez_j-Fz_i)^2}+F_i)*f_s/c \quad (1)$$

Wherein: $f_s$ is the AD sampling rate, and $Addr_{ij}$ is generally a decimal. In the actual beam formation, the number respectively stored in the two RAMs, of which the addresses are in closest proximity to $Addr_{ij}$, is read and then interpolated according to the decimal part of $Addr_{ij}$.

As the distance between various focuses being focused is generally equal, therefore:

$$Fx_i=Fx_0+i*\Delta Fx \quad (2)$$

$$Fz_i=Fz_0+i*\Delta Fz \quad (3)$$

$$F_i=i*\sqrt{\Delta Fz^2+\Delta Fx^2}=i*\Delta F \quad (4)$$

In the formulae (2), (3) and (4), $\Delta Fx$, $\Delta Fz$ and $\Delta F$ refer to the difference between the horizontal coordinates, the difference between the vertical coordinates and the difference between the distances of two adjacent receive focuses (see FIG. 3) respectively.

Inserting (2), (3) and (4) into (1) and assuming $c/f_s=C$, so $$Addr_{ij}=\left(\sqrt{\left(\frac{Elex_j}{C}-\frac{Fx_0}{C}-i*\frac{\Delta F_x}{C}\right)^2+\left(\frac{Elez_j}{C}-\frac{Fz_0}{C}-i*\frac{\Delta F_z}{C}\right)^2}\right)+i*\frac{\Delta F}{C} \quad (5)$$

If the receive focus reading address is calculated every other N sampling points (the reading address of any sampling point from first to N−1th sampling point in a segment is always the result of the reading address of the sampling point immediately therebefore plus 1), then the distance between two adjacent receive focuses is represented as:

$$\Delta F=N/f_s*c/2 \quad (6)$$

Inserting (6) into (5)

$$Addr_{ij}=\left(\sqrt{\left(\frac{Elex_j}{C}-\frac{Fx_0}{C}-i*\frac{\Delta F_x}{C}\right)^2+\left(\frac{Elez_j}{C}-\frac{Fz_0}{C}-i*\frac{\Delta F_z}{C}\right)^2}\right)+i*N/2 \quad (7)$$

Formula (7) is the basis for designing hardware intended for real-time calculation of beamformation reading address. It can be seen from formula (7) that C quantified array element coordinate may be written in the hardware memory, and $Fx_0/C$, $Fz_0/C$, $\Delta F_z/C$ and $\Delta F_x/C$ may also be stored in the hardware (in some cases, these values are associated with the angle and position of a receive line and may be updated by a controller on a real-time basis during scanning), and that the receive focus coordinate and $i*N/2$ in formula (7) may be calculated by an accumulator. Thus, the apparatus useful for real-time calculation of receive focusing parameters for beamforming according to a first embodiment of the present invention comprises:

a first accumulator and a second accumulator for calculating a quantified focus coordinate (Fx,Fz);

a distance determination circuit for calculating the distance between the quantified focus coordinate (Fx,Fz) and quantified coordinate ($Elex_j$,$Elez_j$) of the j-th array element of a probe;

a third accumulator for accumulating the value of i*N/2;

a third summator for reading the output results of the third accumulator and the distance determination circuit, adding both output results up and outputting the added-up result as a reading address of echo data calculated in real time.

Figure 5:
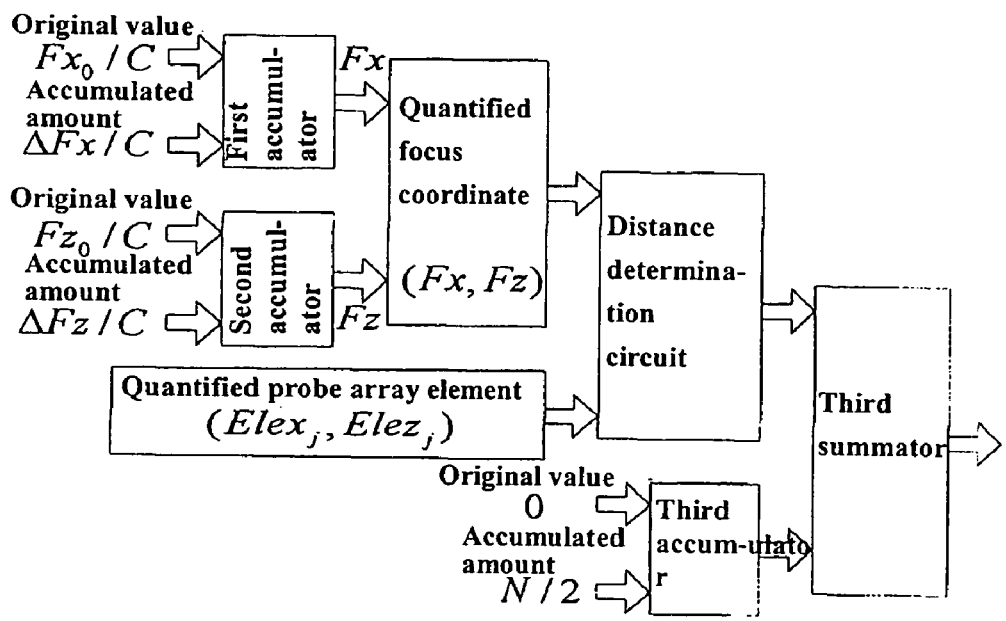
FIG. 5 is a block diagram of the calculation hardware necessary for implementing the method for real-time calculation of focusing parameters shown in FIG. 3.

One input end of the distance determination circuit is coupled to the output ends of the first accumulator and the second accumulator, while the other input end is coupled to the output value of the quantified coordinate ($Elex_j$,$Elez_j$) of the j-th array element of the probe. The output ends of the distance determination circuit and the output ends of the third accumulator are coupled together to the input ends of the third summator, as shown in FIG. 5.

II. Beam Correction

Figure 4:
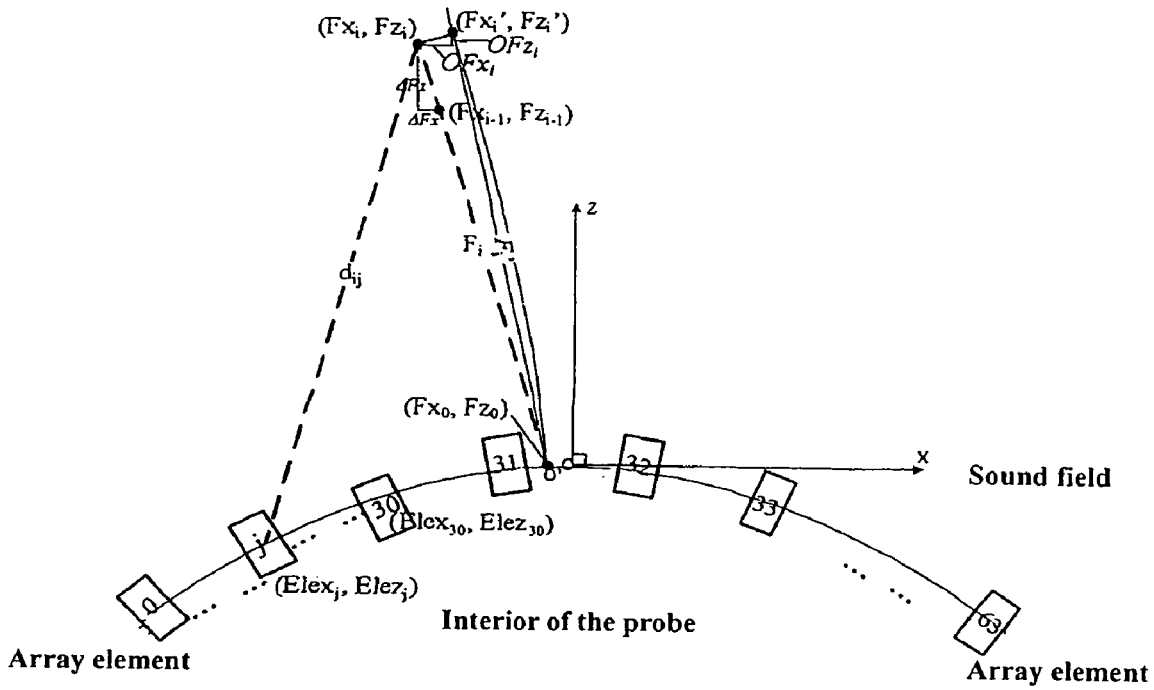
FIG. 4 is a schematic view of the method for real-time calculation of receive focusing parameters for beamforming according to the present invention, wherein beam correction is taken into consideration.

Beam correction is to make sure that the receive path corresponding to a receive focusing parameter is arcuate, instead of linear. Beam correction is rather common in receiving multi-beam. As shown in FIG. 4, the line from O' to ($Fx_i$, $Fz_i$) is an ideal receive line. By controlling the receive parameter, an arc shown in solid line starting from O' may be considered as an actual receive line. Making a receive line being arcuate is referred to as the beam correction.

As the beam is corrected, the coordinate of the i-th receive focus is ($Fx_i'$, $Fz_i'$) shown in FIG. 4, instead of ($Fx_i$, $Fz_i$).

$$Fx_i'=Fx_i+OFx_i \quad Fz_i'=Fz_i+OFz_i$$

$OFx_i$ and $OFz_i$ are correction value in the directions of x and z with respect to the ideal receive focus ($Fx_i$, $Fz_i$). Taking beam correction into consideration, formula (1) may be modified as:

$$Addr_{ij}=(\sqrt{(Elex_j-Fx_i')^2+(Elez_j-Fz_i')^2}F_i')*f_s/c \quad (8)$$

$F_i'$ is the distance from the actual receive focus to the starting point of the receive line when beam correction is taken into consideration. Since the correction value is very small, it may be approximately deemed that $F_i=F_i'$. Therefore, formula (8) may be altered into:

$$Addr_{ij} = \left( \sqrt{\left(\frac{Elex_j}{C} - \frac{Fx_0}{C} - i*\frac{\Delta F_x}{C} - \frac{OFz_i}{C}\right)^2 + \left(\frac{Elez_j}{C} - \frac{Fz_0}{C} - i*\frac{\Delta F_z}{C} - \frac{OFz_i}{C}\right)^2} + i*N/2 \right) \quad (9)$$

$OFx_i$ and $OFz_i$ are variables associated with the depth of a receive focus and the angle of a receive line. If both of them need to be stored, a larger storing resource shall be consumed (especially for phased arrays). Therefore, the following method is used to save storing spaces:

Referring to FIG. 4, it is derivable that:

$$OFz_i/\Delta Fx=OFx_i/\Delta Fz=OF_i/\Delta F \quad (10)$$

Assuming the precision of the beam correction to be $i/N_d$ portion of $\Delta F$, i.e. $OF_i=k_i*\Delta F/N_d$, the following equations may be obtained:

$$OFz_i=k_i*\Delta Fx/N_d \quad OFx_i=k_i*\Delta Fz/N_d \quad (11)$$

Inserting (11) into (9), it may be obtained that:

$$Addr_{ij} = \left( \sqrt{\left(\frac{Elex_j}{C} - \frac{Fx_0}{C} - i*\frac{\Delta F_x}{C} - k_i\frac{\Delta F_x}{N_d*C}\right)^2 + \left(\frac{Elez_j}{C} - \frac{Fz_0}{C} - i*\frac{\Delta F_z}{C} - k_i\frac{\Delta F_z}{N_d*C}\right)^2} + i*N/2 \right)$$

Given $N_d$ is an integral power of 2, $\Delta Fz/N_d$ and $\Delta Fx/N_d$ is derivable using a shifter.

The distance between the corrected receive focus and the ideal receive focus may be approximately deemed to be a parameter only associated with the depth of a receive focus but having nothing to do with the angle of a receive line. This is to say, the storage of $k_i$ only suffices to accomplish the beam correction of all different receive lines. In this case, the storage volume of the hardware is significantly reduced. The hardware may also store incremental change $\Delta k_i$ of $k_i$ with respect to $k_{i-1}$, which further reduces the storage volume. As $\Delta k_i$ is selected from the group consisting of 1, 0 and −1 only, $k_i$ may be calculated using the equation as follows:

$$k_i=k_{i-1}+\Delta k_i \quad (12)$$

Figure 6:
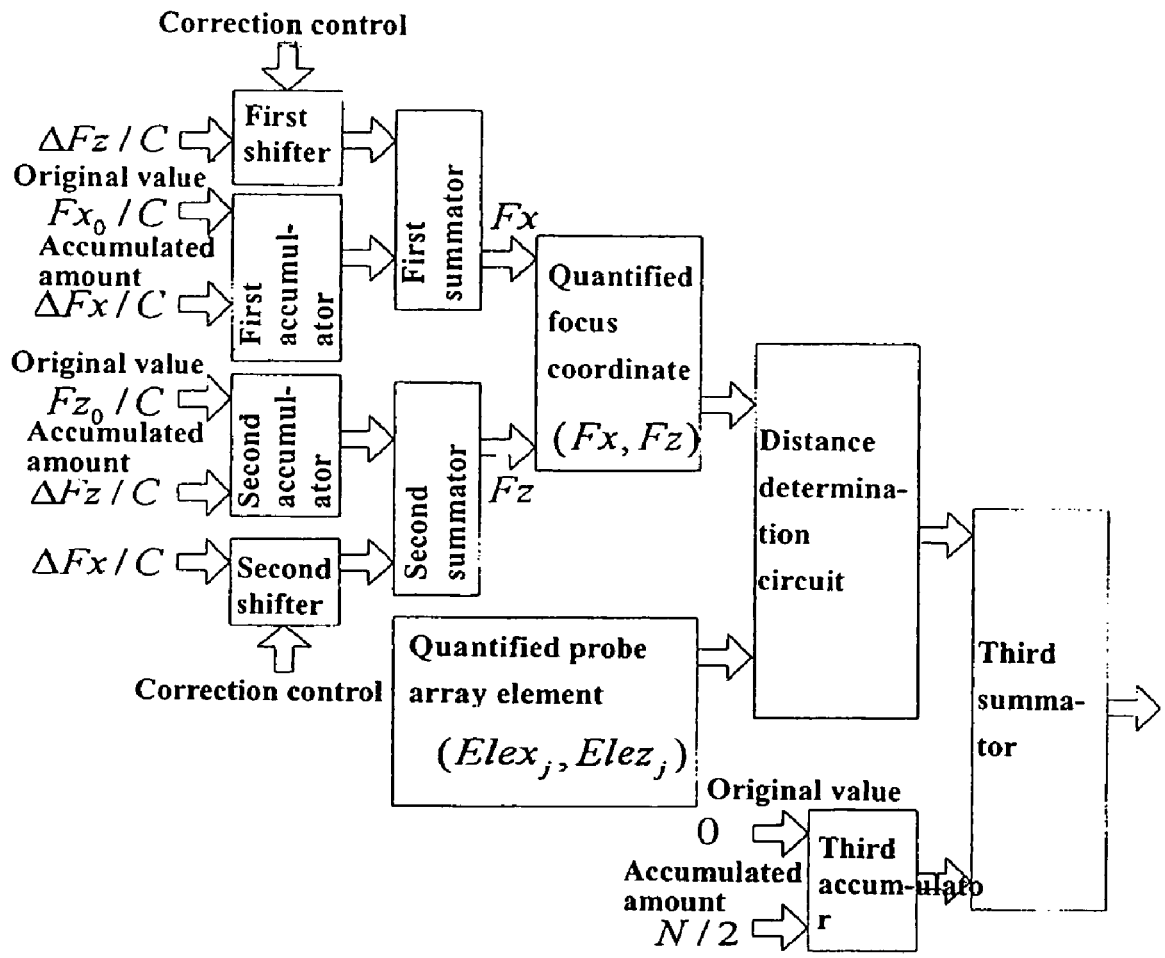
FIG. 6 is a block diagram of the calculation hardware necessary for implementing the method for real-time calculation of receive focusing parameters shown in FIG. 4, wherein beam correction is taken into consideration.

As seen from FIG. 6, the block diagram of the logic portion taking beam correction into consideration is shown. The apparatus so designed for real-time calculation of receive focusing parameters for beamforming having a beam correction function (a second embodiment) includes:

a first accumulator, a first shifter and a first summator for calculating Fx of a quantified focus coordinate (Fx,Fz), a second accumulator, a second shifter and a second summator for calculating Fz of the quantified focus coordinate (Fx,Fz);

a distance determination circuit for calculating the distance between the quantified focus coordinate (Fx,Fz) and quantified coordinate ($Elex_j$,$Elez_j$) of the j-th array element of a probe;

a third accumulator for accumulating the value of i*N/2;

a third summator for reading the output results of the third accumulator and the distance determination circuit, adding both output results up and outputting the added-up result as a reading address of echo data calculated in real time.

An input end of the first summator is coupled to the first accumulator and the first shifter; an input of the second summator is coupled to the second accumulator and the second shifter; and one input end of the distance determination circuit is coupled to output ends of the first summator and the second summator, another input end of the distance determination circuit is coupled to the output of the quantified coordinate ($Elex_j$,$Elez_j$) of the j-th array element of the probe, while an output of the distance determination circuit and the output of the third accumulator are coupled together to the inputs of the third summator.

III. Accomplishment of Hardware

Figure 7:
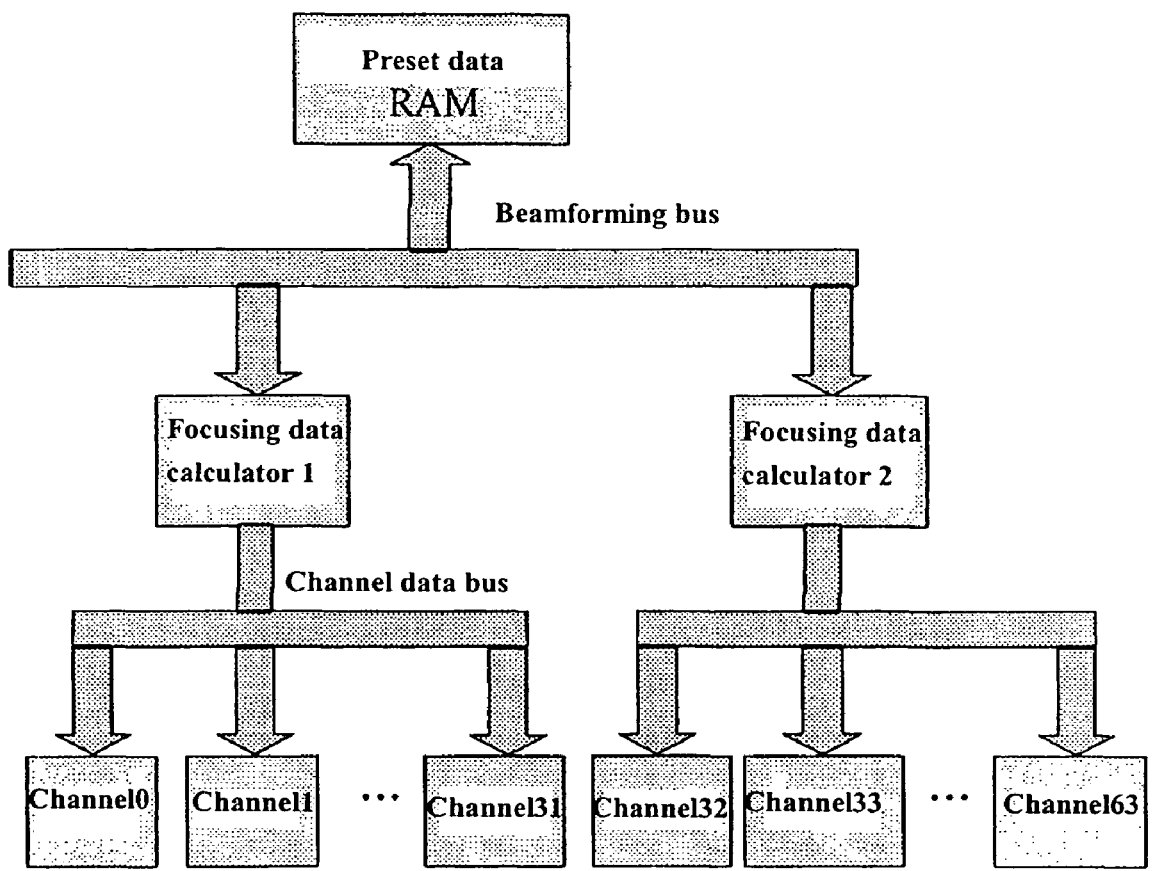
FIG. 7 is a schematic view showing the application of hardware of the apparatus for real-time calculation of receive focusing parameters for beamforming according to the present invention.

As shown in FIG. 7, each of the real-time parameter calculation modules (i.e. the focusing data calculators in FIG. 7, each comprising all the hardware units in FIG. 5 or FIG. 6) may be time division multiplexing in 32 channels, so two calculation modules are needed in a 64-channel dualbeam system, each responsible for the real-time calculation of the parameters of 32 channels. If N beams shall be received in real time, the number of the modules should be 2N.

At the beginning of the calculation of each receive line, the preset parameters of each channel need to be loaded in the corresponding calculation module via the beamformation bus, and each of the modules shall output the focusing parameter data of the corresponding channel in series. If the system shifts the focus at a frequency of 3.75 MHz (⅛ of the sampling rate) and the focus is shifted every 8 timing clock, the focusing data calculator must operate at 120 MHz (3.75*32).

IV. Parameter Mechanism

The pre-stored parameters include only the array element coordinate within a channel (quantified value), and if the beam correction is taken into consideration, the corrected value $k_i$ or incremental change $\Delta k_i$ needs to be stored.

It is to be understood, however, that even though numerous characteristics and advantages of the present invention have been set forth in the foregoing description together with details of the structure and function of the invention, the disclosure is illustrative only, and that changes may be made in detail, especially in matters of shape, size, and arrangement of parts within the principles of the invention to the full extent indicated by the broad general meaning of the terms in which the appended claims are expressed.

What is claimed is:

1. A method for real-time calculation of receive focusing parameters for beamforming, the method comprising the steps of:
   a. each array element of a probe receiving the reflected echo signal from a receive line;
   b. each array element of said probe transmitting the reflected echo signal as received to respective signal receiving and processing channel for processing and analog-to-digital conversion;
   c. transmitting the digitized echo data of each channel after analog-to-digital conversion into a FIFO memory;
   d. a beamformation parameter generating module calculating in real time the reading address of digitized echo signal of the FIFO memory of each channel;
   e. a receive beamforming module, via a beamforming bus, reading the echo data of each receive channel and performing beamforming, according to the reading address generated by the beamformation parameter generating module.

2. The method of claim 1, wherein if the reading address is calculated every other N sampling points in step d, the reading address corresponding to the echo data concerning the j-th channel and the i-th receive focus of a certain signal receive line are calculated using the formula as follows:

$$Addr_{ij} = \left( \sqrt{\left(\frac{Elex_j}{C} - \frac{Fx_0}{C} - i*\frac{\Delta F_x}{C} - k_i\frac{\Delta F_x}{N_d*C}\right)^2 + \left(\frac{Elez_j}{C} - \frac{Fz_0}{C} - i*\frac{\Delta F_z}{C} - k_i\frac{\Delta F_z}{N_d*C}\right)^2} \right) + i*N/2$$

Wherein ($Elex_j$, $Elez_j$) and ($Fx_0$, $Fz_0$) are the coordinate of the j-th array element of the probe and the coordinate of the i-th receive focus of a certain signal receive line, respectively; $\Delta F_x$ and $\Delta F_z$ are the difference value of horizontal coordinates and of vertical coordinates of two adjacent receive focuses, respectively, C is the ratio of the echo speed to the sampling rate $f_s$, and $N_d$ is an integral power of 2.

3. The method of claim 1, wherein if the reading address is calculated every other N sampling points in step d, the reading address corresponding to the echo data concerning the j-th channel and the i-th receive focus of that certain signal receive line are calculated using the formula as follows:

$$Addr_{ij} = \left( \sqrt{\left(\frac{Elex_j}{C} - \frac{Fx_0}{C} - i*\frac{\Delta F_x}{C}\right)^2 + \left(\frac{Elez_j}{C} - \frac{Fz_0}{C} - i*\frac{\Delta F_z}{C}\right)^2} \right) + i*N/2$$

Wherein ($Elex_j$, $Elez_j$) and ($Fx_0$, $Fz_0$) are the coordinate of the j-th array element of the probe and the coordinate of the i-th receive focus of a certain signal receive line, respectively; $\Delta F_x$ and $\Delta F_z$ are the difference value of horizontal coordinates and of vertical coordinates of two adjacent receive focuses, respectively; and C is the ratio of the echo speed to the sampling rate $f_s$.

4. The method of claim 2, wherein a hardware for real-time calculation of the reading address of echo data is accomplished through the following steps of:
   i. calculating the original value $Fx_0/C$ and its accumulated amount $i\Delta Fx/C$ using a first accumulator, calculating the original value $Fz_0/C$ and its accumulated amount $i\Delta Fz/C$ using a second accumulator, and calculating $k_i\Delta Fx/(CN_d)$ and $k_i\Delta Fz/(CN_d)$ respectively using a first shifter and a second shifter;
   ii. adding up the output results of the first accumulator and the first shifter using a first summator and adding up the output results of the second accumulator and the second shifter using a second summator, so as to obtain the quantified focus coordinate (Fx,Fz)
   iii. a distance determination circuit reading the quantified focus coordinate (Fx,Fz) and quantified coordinate ($Elex_j$, $Elez_j$) of the j-th array element of the probe and calculating the distance between the two coordinates;
   iv. accumulating to obtain the value of i*N/2 using a third accumulator;
   v. adding up the output results of the third accumulator and the distance determination circuit using a third summator, and the output result of the third summator being the reading address of the echo data calculated in real time.

5. The method of claim 3, wherein a hardware for real-time calculation of the reading address of echo data is accomplished through the following steps of:
   i. calculating the original value $Fx_0/C$ and its accumulated amount $i\Delta Fx/C$ using a first accumulator, calculating the original value $Fz_0/C$ and its accumulated amount $i\Delta Fz/C$ using a second accumulator, so as to obtain a quantified focus coordinate (Fx,Fz);
   ii. a distance determination circuit reading the quantified focus coordinate (Fx,Fz) and quantified coordinate ($Elex_j$, $Elez_j$) of the j-th array element of the probe and calculating the distance between the two coordinates;
   iii. calculating the value of i*N/2 with a third accumulator;
   iv. adding up the output results of the third accumulator and the distance determination circuit using a third summator, and the output result of the third summator being the reading address of the echo data calculated in real time.

6. An apparatus for real-time calculation of receive focusing parameters for beamforming, the apparatus coupled to the signal input end of the receive beamforming module of an ultrasound imaging system as an independent accessory, the apparatus including at least one focusing data calculator, wherein the focusing data calculator comprises:
   a first accumulator and a second accumulator for calculating a quantified focus coordinate (Fx,Fz);
   a distance determination circuit for calculating the distance between the quantified focus coordinate (Fx,Fz) and quantified coordinate ($Elex_j$, $Elez_j$) of the j-th array element of a probe;

a third accumulator for accumulating the value of i*N/2;
a third summator for reading the output results of the third accumulator and the distance determination circuit, adding both output results up and outputting the added-up result as a reading address of echo data calculated in real time.

7. The apparatus of claim 6, wherein one input end of the distance determination circuit is coupled to the output ends of the first accumulator and the second accumulator; another input end is coupled to the output value of the quantified coordinate (Elex$_j$,Elez$_j$) of the j-th array element of the probe; and the output end of the distance determination circuit and the output end of the third accumulator are coupled together to the input ends of the third summator.

8. The apparatus of claim 7, wherein the focusing data calculator is time division multiplexing in M channel, that is, each focusing data calculator is responsible for the real-time calculation of the parameters of M channels; and where the system has more than M channels, multiple parallel focusing data calculators are used.

9. The apparatus of claim 8, wherein M ranges from 1 to 512, typically 32 or 64.

10. The apparatus of claim 7, wherein the reading address of the echo data is calculated by the third summator using the formula as follows:

$$Addr_{ij} = \left( \sqrt{\left(\frac{Elex_j}{C} - \frac{Fx_0}{C} - i*\frac{\Delta F_x}{C}\right)^2 + \left(\frac{Elez_j}{C} - \frac{Fz_0}{C} - i*\frac{\Delta F_z}{C}\right)^2} \right) + i*N/2$$

Wherein (Elex$_j$,Elez$_j$) and (Fx$_0$,Fz$_0$) are the coordinate of the array element of the probe corresponding to the j-th channel and the coordinate of the i-th receive focus of a certain signal receive line, respectively; $\Delta F_x$ and $\Delta Fz$ are the difference value of horizontal coordinates and of vertical coordinates of two adjacent receive focuses, respectively; and C is the ratio of the echo speed to the sampling rate $f_s$.

11. An apparatus with beam correction function for real-time calculation of receive focusing parameters for beamforming, the apparatus coupled to the signal input end of the receive beamforming module of an ultrasound imaging system as an independent accessory, and including at least one focusing data calculator, wherein the focusing data calculator comprises:
a first accumulator, a first shifter and a first summator for calculating Fx of a quantified focus coordinate (Fx,Fz);
a second accumulator, a second shifter and a second summator for calculating Fz of the quantified focus coordinate (Fx,Fz);
a distance determination circuit for calculating the distance between the quantified focus coordinate (Fx,Fz) and quantified coordinate (Elex$_j$,Elez$_j$) of the j-th array element of a probe;
a third accumulator for accumulating the value of i*N/2;
a third summator for reading the output results of the third accumulator and the distance determination circuit, adding both output results up and outputting the added-up result as a reading address of echo data calculated in real time.

12. The apparatus of claim 11, wherein an input end of the first summator is coupled to the first accumulator and the first shifter; the input end of the second summator is coupled to the second accumulator and the second shifter; one input end of the distance determination circuit is coupled to the output ends of the first summator and the second summator, while another input end of the distance determination circuit is coupled to the output of the quantified coordinate (Elex$_j$, Elez$_j$) of the j-th array element of the probe; and the output end of the distance determination circuit and the output end of the third accumulator are coupled together to the inputs of the third summator.

13. The apparatus of claim 12, wherein the focusing data calculator is time division multiplexing in M channel, that is, each of the focusing data calculator is responsible for the real-time calculation of the parameters of M channels, and where the system has more than M channels, multiple parallel focusing data calculators are used.

14. The apparatus of claim 13, wherein M ranges from 1 to 512, typically 32 or 64.

15. The apparatus of claim 12, wherein the reading address of the echo data is calculated by the third summator using the formula as follows:

$$Addr_{ij} = \left( \sqrt{\left(\frac{Elex_j}{C} - \frac{Fx_0}{C} - i*\frac{\Delta F_x}{C} - k_i\frac{\Delta Fx}{N_d*C}\right)^2 + \left(\frac{Elez_j}{C} - \frac{Fz_0}{C} - i*\frac{\Delta F_z}{C} - k_i\frac{\Delta F_z}{N_d*C}\right)^2} \right) + i*N/2$$

Wherein: (Elex$_j$,Elez$_j$) and (Fx$_0$,Fz$_0$) are the coordinate of the j-th array element of the probe and the coordinate of the i-th receive focus of a certain signal receive line, respectively; $\Delta F_x$ and $\Delta Fz$ are the difference value of horizontal coordinates and of vertical coordinates of two adjacent receive focuses, respectively; C is the ratio of the echo speed to the sampling rate $f_s$, and $N_d$ is an integral power of 2.

* * * * *